May 19, 1931. A. K. SJOLANDER Re. 18,075
ADJUSTABLE BEARING
Original Filed Dec. 24, 1927 2 Sheets-Sheet 1
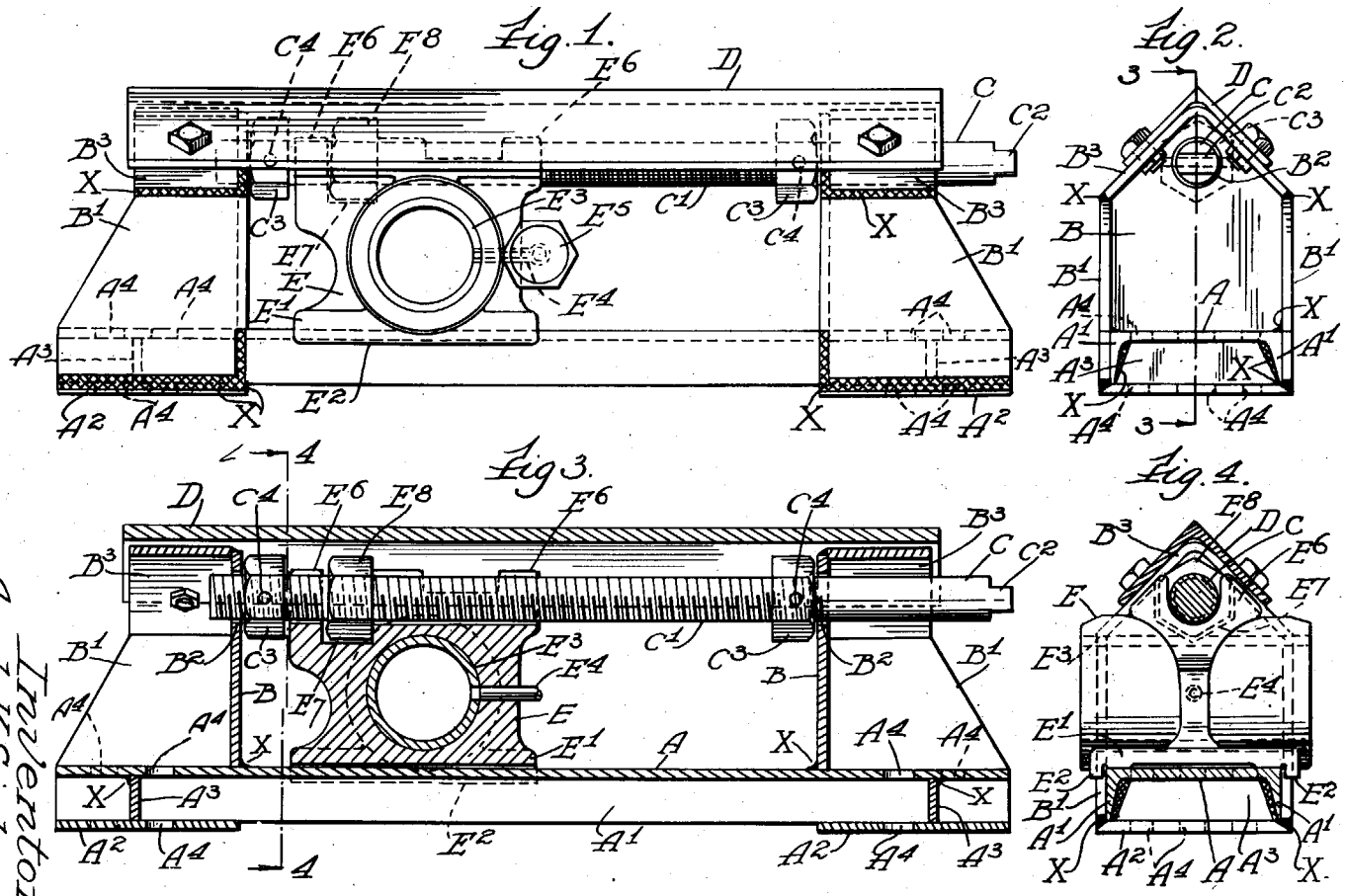
Inventor.
Axel K. Sjolander.
by Parker & Carter
Attorneys.

May 19, 1931. A. K. SJOLANDER Re. 18,075

ADJUSTABLE BEARING

Original Filed Dec. 24, 1927 2 Sheets-Sheet 2

Inventor.
Axel K. Sjolander.
by Parker & Carter
Attorneys.

Reissued May 19, 1931

Re. 18,075

UNITED STATES PATENT OFFICE

AXEL K. SJOLANDER, OF CHICAGO, ILLINOIS, ASSIGNOR TO LINK-BELT COMPANY, OF CHICAGO, ILLINOIS, A CORPORATION OF ILLINOIS

ADJUSTABLE BEARING

Original No. 1,778,231, dated October 14, 1930, Serial No. 242,456, filed December 24, 1927. Application for reissue filed February 16, 1931. Serial No. 516,230.

This invention relates to a bearing support and particularly to a bearing adapted for adjustment. In the form shown it is particularly adapted for use as a support for bearings used in connection with conveyors and conveyor chains where it is necessary to adjust the bearing to compensate for wear and to compensate for other changes which may occur. One object of the invention is to provide a strong and rigid bearing support which is capable of minute and rapid adjustment and which is positive and self-locking. Another object is to provide a bearing support or take up of the general type shown, which is in effect formed of a single piece of material. As shown herein, it is made of several pieces welded and thus is, in effect, formed of a single member. Another object of the invention is to provide a take up wherein the bearing housing travels along a track with the take up screw on the opposed side of the bearing housing from the track so that the journal carried in the bearing housing is between the track and take up screw and wherein a minimum distance between the central axis of the journal and the support and track will be obtained, thus raising the threaded screw away from the support and protecting it against rusting, clogging and the like. Another object of the invention is to make it possible to lock the take up screw directly under the top covering member in a position where it can be inspected and lubricated easily and wherein it will be protected against clogging, rusting and the like. Another object of the invention is to lock the take up screw in such a potion that all that is necessary for inspection, cleaning and maintenance is the removal of the cover. It is not necessary to remove the track or the journal center and the positioning of the screw above the journal center with the journal between the screw and the track permits keeping the take up shaft or journal center close to the track or base, thus reducing any tendency toward over-turning and so decreasing friction on the guide track. Other objects will appear from time to time in the specification and claims.

The invention is illustrated more or less diagrammatically in the accompanying drawings wherein—

Figure 1 is a side elevation;

Figure 2 is an end view with the bearing omitted;

Figure 3 is a longitudinal vertical cross section taken generally on line 3—3 of Figure 2, with the bearing in place;

Figure 4 is a vertical cross section taken on line 4—4 of Figure 3; and

Like parts are illustrated by like characters throughout the specification and drawings.

Figure 5:
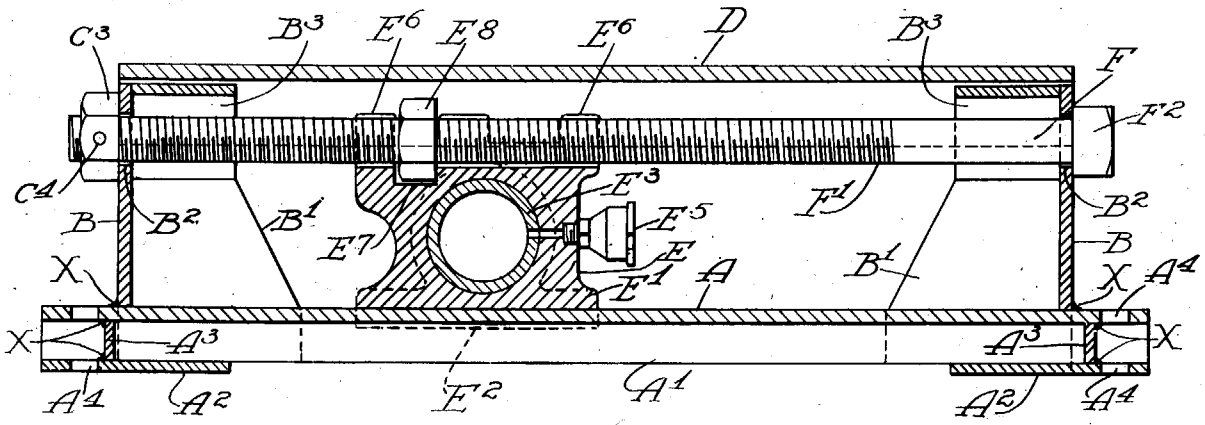
Figure 5 is a view similar to Figure 3, showing a modified form.

A is a base portion which is formed generally, as shown, of channel sections, provided with downwardly depending side members $A^1$. Adjacent each end it may have an added strengthening member $A^2$ which extends across and joins the downwardly extending members $A^1$ at their bottoms. $A^3$, $A^3$ are additional reinforcing members extending laterally across the member A and serving to brace the parts more rigidly. $A^4$ $A^4$ are holes formed in the member A and the reinforcing member $A^2$ by means of which the parts may be screwed, bolted, or otherwise fastened to any suitable support.

Adjacent each end of the member A is an upwardly extending member B which is welded to the member A. It is provided with an angular upper edge, as shown, and has also rearwardly extending bracing members $B^1$. These members overlie the member A extending downwardly slightly beyond the member $A^1$ and are joined to the member $A^2$. Each of the members B is perforated as at $B^2$ to provide for the threaded adjusting shaft C. $B^3$ $B^3$ are angularly shaped members, one of which is welded to each of the members B and at its lower edges, to a pair of the members $B^1$, the place of welding being indicated as X.

The shaft C is threaded as at $C^1$, is square notched, or otherwise provided with an angularly shaped end portion $C^2$ and is locked in position by a pair of nuts $C^3$ $C^3$, each of which is pinned onto the shaft C by a pin or screw $C^4$. Thus the shaft C is in a position to rotate within the frame work made up of the parts A and B, but it cannot come out of the frame work.

D is an angularly shaped member which forms in effect a roof over the threaded shaft. It is preferably bolted to the members $B^3$, although it might be otherwise fastened to them.

E is a bearing housing member provided with a laterally extended bearing $E^1$ which has at its outer edges downwardly depending flanges $E^2$. $E^3$ is a bushing in the bearing E. $E^4$ is a lubricant connection. At $E^5$ is a grease or oil cup or other lubricant containing member. Adjacent the upper end the bearing housing E is provided with notched lugs $E^6$ $E^6$ which partially inclose the threaded part $C^1$ of the shaft C. $E^7$ is an angularly shaped notch formed in the upper part of the bearing housing E. Within this notch is positioned and held the nut $E^8$ which is engaged on the threads $C^1$ of the shaft C. By means of this construction when the shaft C is rotated, it will rotate with relation to the nut $E^8$, and since this nut is held against rotation, the rotation of the shaft will cause the nut to move along it and will thus cause the bearing housing to be moved backwards and forwards in response to this rotation of the shaft. In view of the shape and relative position of the threads of the shaft and the nut, the shaft cannot be rotated by pressure upon the nut from the bearing and the device therefore is self-locking and can only be moved when the shaft is positively rotated to cause movement.

There is shown in Figure 5 a modified form which is similar to the construction shown in Figure 3 except that the end pieces B and $B^1$ are turned about and their vertical end faces point outward rather than inward. One result of this is to lengthen the possible travel of the bearing within the take up assembly without lengthening the assembly as a whole. In the form shown in Figure 3 the effective length for bearing travel is the distance inside the faces B whereas the effective length of the device shown in Figure 5 is also the distance between the faces B but they have been reversed and thus where the member D remains the same in length, the effective length of travel of the bearing is materially increased. In the form shown in Figure 5 instead of the screw C, as used in Figure 3, a bolt F is used. It is provided with a threaded portion $F^1$ and a head $F^2$. The nuts upon it are the same as those used in the form shown in Figure 3.

I claim:

1. In combination in an adjustable bearing support member, a main base member comprising a supporting frame work and guiding track, such member provided with end portions, a bearing block formed to engage said track element and adapted to be moved therealong, a moving and controlling shaft mounted for rotation in the end portions of such base member, provided with a thread, so that rotation of the shaft causes the bearing block to move along the base member, the bearing block being located between the track and the shaft, and a covering member, removably attached to the upward end portions, lying above and extending laterally and downwardly with relation to such threaded shaft, whereby the shaft is protected from the deposit of dirt and foreign matter in general.

2. In combination in an adjustable bearing support member, a main base member comprising a supporting frame work and guiding track, such member provided with end portions, a bearing block formed to engage said track element and adapted to be moved therealong, a moving and controlling shaft mounted for rotation in the upper end portion of such base member, provided with a thread and carrying a nut, said nut engaging said bearing block and being held against rotation therein, so that rotation of the shaft causes the bearing block to move along the base member, and a covering member removably attached to the upward end portions, lying above and extending laterally and downwardly with relation to such threaded shaft, whereby the shaft is protected from the deposit of dirt and foreign matter in general.

3. In combination in an adjustable bearing support member, a main base member comprising a supporting frame work and guiding track, such member provided with raised end portions and spaced reinforcing elements, a bearing block formed to overlap said track element and adapted to be moved therealong, a moving and controlling shaft mounted for rotation in the upper end portions of such base member, provided with a thread, and carrying a nut, said nut engaging said bearing block and being held against rotation therein, so that rotation of the shaft causes the bearing block to move along the base member, and a covering member removably attached to the upward end portions, lying above and extending laterally and downwardly with relation to such threaded shaft, whereby the shaft is protected from the deposit of dirt and foreign matter in general.

4. An adjustable bearing comprising a track, upwardly projecting end pieces rigidly associated therewith, a bearing housing mounted for travel along the track, an adjusting screw mounted for rotation in and held against longitudinal movement with respect to the end pieces and in threaded relation with the housing whereby rotation of the screw causes movement thereof along the track, the bearing in the housing being located between the screw and the track, and adapted to be constrained by the screw and by the track to movement along a path parallel with the parallel axes of the screw and track.

5. An adjustable bearing comprising a track, upwardly projecting end pieces rigidly associated therewith, an adjusting screw mounted for rotation in and held against longitudinal movement with respect to said end pieces, a bearing housing mounted for travel along the track, the bearing being located between the track and the screw and means associated with the screw and bearing housing whereby rotation of the screw will cause movement of the housing along the track, the screw engaging the housing at a point removed from the track to assist the track in constraining the movement of the housing to a path parallel with the parallel axes of track and screw.

6. An adjustable bearing comprising a track, upwardly projecting end pieces rigidly associated therewith, a bearing housing mounted for travel along the track, an adjusting screw mounted for rotation in and held against longitudinal movement with respect to the end pieces and in threaded relation with the housing whereby rotation of the screw causes movement thereof along the track, the bearing in the housing being located between the screw and the track, a cover plate mounted on the end pieces and located on the side of the screw opposed to the housing and the track, the cover plate overlying the path of and entirely out of contact with the bearing housing.

7. An adjustable bearing comprising a track, upwardly projecting end pieces rigidly associated therewith, a cover plate mounted on the end pieces and overlying the track, a bearing housing mounted for travel along the track, the bearing extending transversely through the housing, its axis being perpendicular to a plane which includes the axes of track and cover plate, an adjusting screw parallel with the track in threaded relation with the housing mounted for rotation in but held against longitudinal movement with respect to the end pieces and located between the bearing and the cover plate, the bearing being located between the screw and the track, the cover plate overlying the path of and entirely out of contact with the bearing housing.

8. In combination in an adjustable bearing support member, a main base member comprising a supporting frame work and guiding track, such member provided with end portions, a bearing block formed to engage said track element and adapted to be moved therealong, a moving and controlling screw mounted for rotation in the end portions of such base member, so that rotation of the screw causes the bearing block to move along the base member, the bearing in the bearing block being located between the track and the screw.

9. In combination in an adjustable bearing support member, a main base member comprising a supporting framework and guiding track, such member provided with end portions, a bearing block formed to engage said track element and adapted to be moved therealong, a moving and controlling screw mounted for rotation in the end portions of such base member, so that rotation of the screw causes the bearing block to move along the base member, the bearing in the bearing block being located between the track and the screw, and a cover member mounted on the upward extending end portions, the cover member overlying the path of and entirely out of contact with the bearing block.

10. In combination in an adjustable bearing support member, a main base member comprising a supporting frame work and guiding track, such member provided with end portions, a bearing block formed to engage said track element and adapted to be moved therealong, a moving and controlling screw mounted for rotation in the end portions of such base member, so that rotation of the screw causes the bearing block to move along the base member, the bearing in the bearing block being located between the track and the screw, and a cover member mounted on the upward extending end portions, the bearing block being between the controlling screw and the track, the cover being on the side of the screw opposed to the bearing block, the cover member overlying the path of and entirely out of contact with the bearing block.

Signed at Chicago, county of Cook and State of Illinois, this 10th day of February, 1931.

AXEL K. SJOLANDER.